US012068595B2

United States Patent
Langer et al.

(10) Patent No.: US 12,068,595 B2
(45) Date of Patent: Aug. 20, 2024

(54) APPARATUS FOR PROTECTION AGAINST INSULATION FAILURE

(71) Applicant: BALA INDUSTRIES AND ENTERTAINMENT PRIVATE LIMITED, Pune (IN)

(72) Inventors: Nitin Langer, Jammu (IN); Mirza Mohammad Idrees Ul Haq Beigh, Srinagar (IN)

(73) Assignee: BALA INDUSTRIES AND ENTERTAINMENT PRIVATE LIMITED, Pune (IN)

( * ) Notice: Subject to any disclaimer, the term of this patent is extended or adjusted under 35 U.S.C. 154(b) by 56 days.

(21) Appl. No.: 17/826,336

(22) Filed: May 27, 2022

(65) Prior Publication Data

US 2022/0385057 A1    Dec. 1, 2022

Related U.S. Application Data

(60) Provisional application No. 63/194,225, filed on May 28, 2021.

(51) Int. Cl.
*H02H 3/08*  (2006.01)
(52) U.S. Cl.
CPC .................................. *H02H 3/083* (2013.01)
(58) Field of Classification Search
CPC ....................................................... H02H 3/083
See application file for complete search history.

(56) References Cited

U.S. PATENT DOCUMENTS 3,342,752 A * 9/1967 Wada ...................... H01C 7/001
                                                     252/511
5,675,468 A * 10/1997 Chang .................... H02H 9/042
                                                     361/111

FOREIGN PATENT DOCUMENTS

JP    10117430 A  *  5/1998

OTHER PUBLICATIONS

Machien translation of JPH 10117430A by Tokawa. (Year: 1998).*

* cited by examiner

*Primary Examiner* — Peter M Novak
(74) *Attorney, Agent, or Firm* — Harness, Dickey & Pierce, P.L.C.

(57) ABSTRACT

The present disclosure envisages an apparatus for providing protection against an insulation failure in an electrical appliance. A first isolating means is connected in phase line of the AC power source. A second isolating means is connected in the neutral line. At least one TRIAC, having two main terminals and one gate terminal, is connected in parallel to appliance. First main terminal is connected to the phase line between first isolating means and electrical appliance, and second main terminal is connected to the neutral line between second isolating means and electrical appliance. The gate terminal is connected to the body of electrical appliance. In the event of insulation failure, the TRIAC, upon being triggered, blows out the first and second isolating means and thereby electrically isolates the appliance from the AC power source.

5 Claims, 5 Drawing Sheets

APPARATUS FOR PROTECTION AGAINST INSULATION FAILURE

TECHNICAL FIELD OF THE DISCLOSURE

This disclosure generally relates to an apparatus for protection from electric shock in the event of an insulation failure, and more particularly against any abnormality or electrical breakdown that results in increased voltage on exposed metallic parts of any equipment.

BACKGROUND OF THE DISCLOSURE

Increased voltages and electrical surges in an electrical system may deliver an electric shock to a user who touches any electrical part of such system. The electrical shock can cause irreversible damage to the person that can lead to muscle spasms that may even cause a heart attack. Further, electric shocks can also affect the central nervous system of the user. When such a shock occurs, the victim may be dazed or may experience amnesia, seizure, or respiratory arrest and in certain cases may lead to death. In order to prevent the hazard of the electric shock, the electrical equipment's are mostly 'grounded and/or earthed'. If the grounding of the appliance is found to be imperfect, it may provide a significant shock to the user. The electrical voltages can be of the order of system voltage for durations lasting from 10 microseconds to a couple of seconds, causing substantial damages to the user, and irreversible danger to life.

Presently grounding and/or earthing is provided for protection against possible electric shock in case of insulation failure in electrical appliances. This system is costly, difficult to layout, requires regular maintenance, and is less reliable. In situations wherein the resistance of earthing point is maintained at low value, at the time of insulation failure, it may lead to a heavy current flow above the threshold limit. When the user comes in contact with the electrical appliance at that particular instance where the voltage is reduced and current is increased, the user will feel a non-fatal electric shock but with high level of discomfort. In such cases, if this heavy current is not interrupted by circuit breakers within a short span of time, it may result in fire hazards. Furthermore in situation where the resistance of earthing point exceeds the specified values, at the time of insulation failure, it may lead to voltage equal to rated voltage. When the user comes in contact with the electrical appliance at that particular instance where the voltage is near or at rated value, the user will experience a fatal electric shock.

In view of the above-mentioned problem, U.S. Pat. No. 5,675,468 (hereinafter referred to as '468') discusses the problem of protecting electronic telecom equipment by disclosing an electric circuit for protecting electronic telecom equipment against electrical power surges, over current, surge voltage, static voltage. '468' includes a minimal discussion on the protection of human life. However, '468' do not provide any protection in case of insulation failure. The circuit disclosed in '468' comprises two fuses in series connected with a TRIAC, along with an over-current sensor and a static potential limiter. Moreover, the patent '468' teaches blowing off of the fuses connected in series in the event of fault/abnormal condition, thereby causing damages to the equipment as well as the user if only one fuse is blown off and the other terminal is still connected to supply.

European Patent No. 0049870A1 discusses a fault current protection device that prevents contact with high voltage during liquid penetration in the electrical equipment. The device consists of a TRIAC which short-circuits the main lead under the influence of water and hence causes the fuse in the circuit to cut out. However, the device offers no protection against either internal/load side fault that might occur within the equipment due to insulation failure or malfunctioning of electrical components within the equipment. Furthermore, the ingress of external water/fluid is must for operation of scheme proposed in European Patent No. 0049870A1

In developing countries like India, there is less awareness of safety, and electrical equipment is often not used as per standards specifications. The type of power system employed in India is an AC 220-240 V, 50 Hz. In unprotected form, electricity has the potential to produce devastating injuries with heavy functional and aesthetic consequences. The reported incidence of electrical current-related burn injuries ranges from 3% to 17% of all admissions in burn units. Because of the widespread availability and commercial utilization of electrical current, there is an increase in electrical current-related injuries in India. Death due to electrocution involves both low-voltage and high-voltage currents. However, most deaths are due to low-voltage currents used in houses and minor industrial settings. Therefore, there is a need for an apparatus that can protect the user from electric shocks in case of electrical surges while eliminating the need of grounding the wire.

Thus, there exists a need for an apparatus to protect the user against electric shocks that overcomes above-mentioned drawbacks.

OBJECTS

The objects of the present disclosure aim to ameliorate the existing problems and difficulty of the prior art or to at least provide useful alternatives as listed herein below.

An object of the present disclosure is to provide an apparatus for protection against insulation failure.

Another object of the present disclosure is to provide a protective apparatus that protects a user from electric shock or high-power surges in an electric appliance.

Yet another object of the present disclosure is to provide a protective apparatus that protects the user against electric shock without the need of grounding or earthing the electric wire.

Still another object of the present disclosure is to provide a protective apparatus that isolates an electric appliance from the power supply in case of current leakage or electrical surges above the threshold limit to protect the appliance.

Yet another object of the present disclosure is to provide a protective apparatus that disconnects the user from the supply-side by blowing off all the fuses connected in series in a protective circuit.

Still another object of the present disclosure is to provide a protective apparatus that can be used to provide protection against insulation failure in both single-phase low power (5A) and high power (15A) loads and three-phase loads.

Other objects and advantages of the present disclosure will be more apparent from the following description, which is not intended to limit the scope of the present disclosure.

SUMMARY

The present invention envisages an apparatus for providing protection against an insulation failure in an electrical appliance. The electrical appliance is capable of being connected to and receiving power from an AC power source. The apparatus comprises a first isolating means, a second isolating means, and at least one TRIAC. The first isolating means is connected in phase line of the AC power source. The second isolating means is connected in the neutral line of the AC power source. The TRIAC has two main terminals and one gate terminal. The TRIAC is connected in parallel to the electrical appliance in a way that a first main terminal of the TRIAC is connected to the phase line after the first isolating means and a second main terminal is connected to the neutral line after the second isolating means through a wire wound resistance. The gate terminal is connected to the body of the electrical appliance through carbon resistance and a DIAC.

In the event of insulation failure in the electrical appliance, a current flows from the body of the appliance into the gate terminal of the TRIAC. The TRIAC is configured to be triggered when a pre-determined level of current flows into the gate terminal. The TRIAC conducts and provides a low-resistance path between the phase line and the neutral line upon being triggered, causing the first and second isolating means to blow out and thereby electrically isolate the appliance from the AC power source.

In an embodiment, the apparatus includes at least two TRIACs. One main terminal of the first TRIAC is connected to the phase line of the AC power source and the other main terminal of the first TRIAC is connected to the neutral line after the second isolating means through a wire wound resistance. One main terminal of the second TRIAC is connected to the phase line after the first isolating means and the other main terminal of the second TRIAC is connected to the neutral line of the AC power source through a wire wound resistance. The gate terminal is connected to the body of the appliance to cause both the isolating means to blow out, when insulation failure occurs in the electrical appliance, to isolate the appliance from the AC power source.

In another embodiment, the first isolating means and second isolating means are fuses.

In still another embodiment, each of the isolating means has a current rating in the range of 5A to 15A.

In yet another embodiment, the apparatus is configured to isolate the electrical appliance from the AC power source in less than 5 milliseconds.

Advantageously, the apparatus provides protection against an insulation failure in single-phase low and high power appliances and three-phase electrical appliances.

BRIEF DESCRIPTION OF DRAWINGS

The accompanying drawings, which are incorporated in and constitute a part of this disclosure, illustrate exemplary embodiments and, together with the description, serve to explain the disclosed embodiments. An apparatus for protection against insulation failure of the present disclosure will now be described with the help of accompanying drawings, in which.

DETAILED DESCRIPTION

Figure 1:
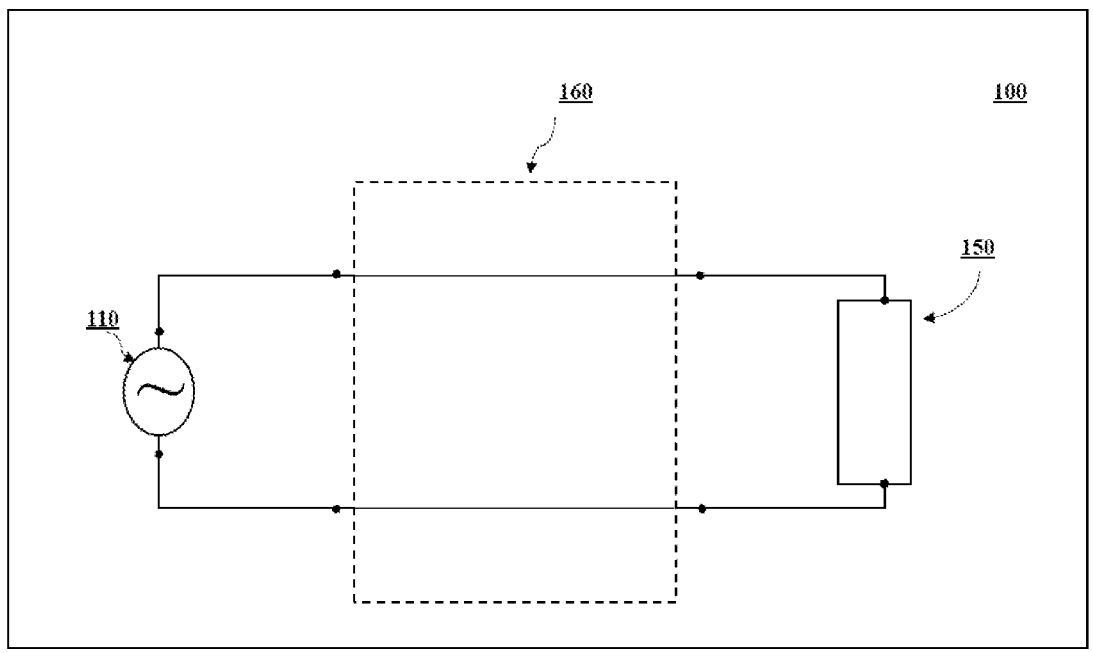
FIG. 1 shows a block diagram of an electronic circuit for protecting a user from current leakage using a protective device.

In the following detailed description of the embodiments of the present disclosure, numerous specific details are set forth in order to provide a thorough understanding of the embodiments of the disclosure. However, it will be obvious to one skilled in the art that the embodiments of the disclosure may be practiced without these specific details. In other instances, well known methods, procedures, components, and circuits have not been described in detail so as not to unnecessarily obscure aspects of the embodiments of the disclosure.

References in the present disclosure to "one embodiment" or "an embodiment" means that a particular feature, structure, characteristic, or function described in connection with the embodiment is included in at least one embodiment of the disclosure. The appearances of the phrase "in one embodiment" in various places in the present disclosure are not necessarily all referring to the same embodiment.

In the present disclosure, the word "exemplary" is used herein to mean "serving as an example, instance, or illustration." Any embodiment or implementation of the present subject matter described herein as "exemplary" is not necessarily to be construed as preferred or advantageous over other embodiments. While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure.

A TRIAC is a bidirectional triode thyristor, i.e., a three electrode A-C semiconductor switch which can be triggered into conduction by a gate signal in a manner. The TRIAC is capable of conducting in either direction of current flow in response to a positive or negative signal on its gate electrode. Because of these characteristics, TRIACS have found wide use in applications involving A-C power control, including light dimming, temperature regulation, solid state relays, solenoid valve operation and motor-speed control.

Referring to FIG. 1, the diagram shows an electronic circuit 100 in accordance with the present disclosure. The circuit 100 includes a protective apparatus 160 connected parallelly/across an electrical appliance 150. The electrical appliance 150 is coupled to an AC power source 110 to receive power from the AC power source 110. An insulation failure in the electric appliance 150 can give an electric shock to a user who is in contact with the electric appliance 150 in the event of the insulation failure.

Figure 2:
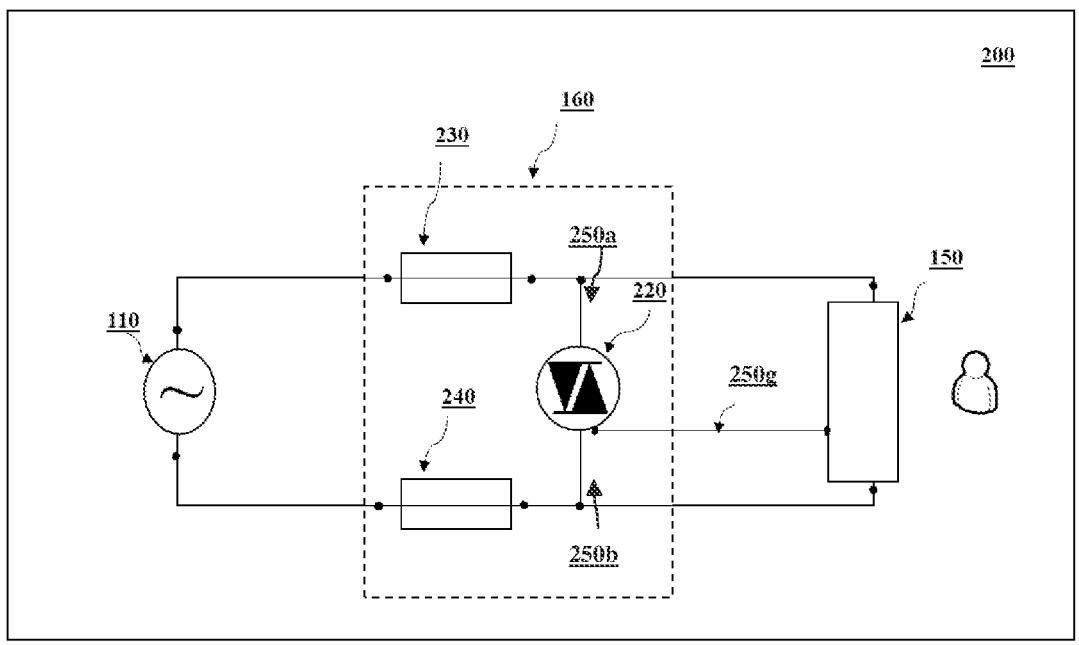
FIG. 2 illustrates a block diagram of the electronic circuit comprising the apparatus for protection against insulation, wherein the apparatus includes a TRIAC connected with two isolating means and other components.

Referring to FIG. 2, the electronic circuit 200, in an embodiment, comprises the apparatus 160 that comprises a first isolating means 230, a second isolating means 240, and a TRIAC 220. In an embodiment, the first isolating means 230 and the second isolating means 240 are fuses. The first isolating means 230 is connected in each phase line of the AC power source 110 and the second isolating means 240 is connected in the neutral line of the AC power source 110. A TRIAC 220 is connected in parallel to the electrical appliance 150.

The TRIAC 220 has two main terminals (250a, 250b) and one gate terminal 250g. The TRIAC 220 is connected in parallel to the electrical appliance 150 in a way that a first main terminal 250a of the TRIAC 220 is connected to the phase line after the first isolating means 230 and a second main terminal 250b is connected to the neutral line after the second isolating means 240 through a wire wound resistance. Further, the gate terminal 250g is connected to a body of the electrical appliance 150 through a carbon resistance and a DIAC.

In an operative embodiment, when the insulation failure occurs in the electrical appliance 150, a current flows from the body of the electrical appliance 150 into the gate terminal 250g of the TRIAC 220. The TRIAC 220 is configured to be triggered when a pre-determined level of current flows into the gate terminal 250g. When the current flows to the gate terminal 250g, upon being triggered, the TRIAC 220 conducts and provides a low-resistance path between the phase line and the neutral line causing the first isolating means 230 and the second isolating means 240 to blow out and thereby electrically isolate the electrical appliance 150 from the AC power source 110.

In an embodiment, the current rating of the first isolating means 230 and the second isolating means 240 is in the range of 5A to 15A for the electrical appliance 150.

The apparatus 160 isolates the electrical appliance 150 from AC power source 110 in less than 5 milliseconds, in order to protect the user from the possibility of an electric shock. The present disclosure translates insulation failure into a short circuit condition thus utilizing the salient feature of the isolating means (230, 240) for the protection from electric shock.

Figure 3:
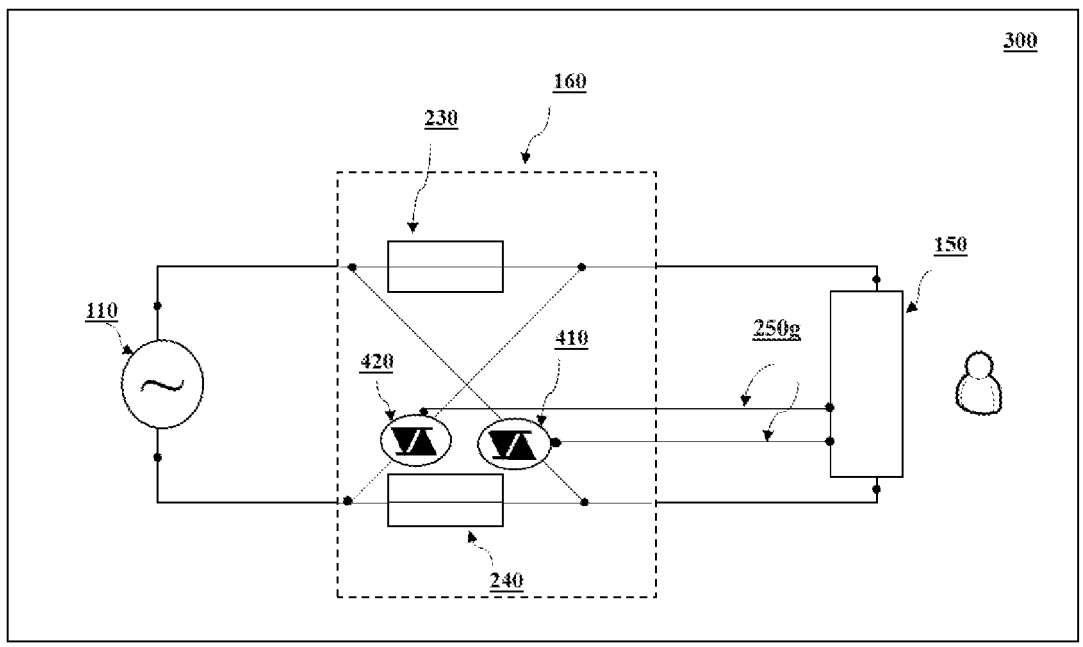
FIG. 3 illustrates a block diagram of the electronic circuit comprising the apparatus for protection against insulation in accordance with an embodiment of the present disclosure, wherein the apparatus includes two isolating means connected with two separate TRIACs and other components.

In another embodiment, referring to FIG. 3, the electronic circuit 300 comprises the apparatus 160 that employs two TRIACs 410 and 420 to ensure that both the isolating means (230, 240) are blown off so as to completely isolate the electrical appliance 150 from the AC power source 110. One main terminal of a first TRIAC 410 is connected to the phase line of the AC power source 110 and the other main terminal of the first TRIAC 410 is connected to the neutral line connected after the second isolating means 240 through a wire wound resistance. Further, one main terminal of a second TRIAC 420 is connected to the phase line after the first isolating means 230 and the other main terminal of the second TRIAC 420 is connected to the neutral line of the AC power source 110 through a wire wound resistance. The gate terminal 250g is connected to the body of the electrical appliance 150 through carbon resistance and DIAC to cause both the isolating means (230, 240) to blow out, when insulation failure occurs in the electrical appliance 150, therefore isolating the electrical appliance 150 from the AC power source 110. The apparatus 160, as described in the disclosure, employs only the two isolating means (230, 240) and the two TRIAC in series, and hence is cost-effective.

Figure 4:
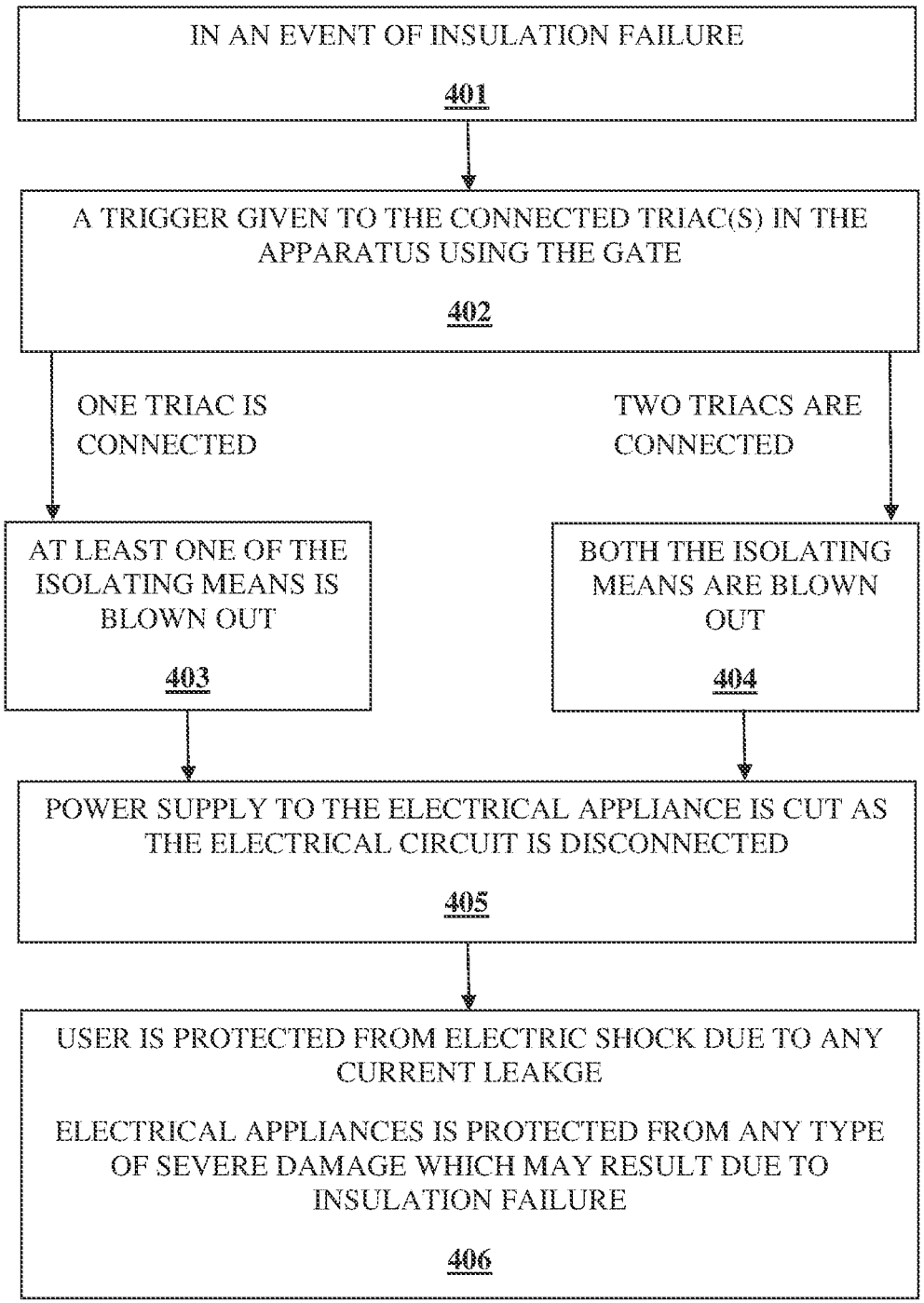
FIG. 4 illustrates a flowchart for working of the apparatus of FIG. 2 and FIG. 3.

Referring to FIG. 4, a flowchart is illustrated, which represents the working of the apparatus 160 mentioned in the present disclosure. When an insulation failure or a current leakage occurs in the electrical appliance 150, as described at step (401), it gives a trigger to the connected TRIAC(s) 220, 410, and/or 420 in the apparatus 160 using the gate 250g, as described at step (402). If only one TRIAC 220 is being used in the apparatus 160, then at least one of the isolating means (230 or 240) is blown out disconnecting phase (live) terminal, as described at step (403). If two TRIACs 410 and 420 are being used in the apparatus 160, then both isolating means (230 and 240) are blown out, as described at step (404). If any one of the isolating means (230 or 240) in the main circuit is blown out, then the main circuit is broken and power supply to an electrical appliance 150 is cut off disconnecting phase (live) terminal, as described at step (405). Thus, the user, who is in contact with the electrical appliance 150, is protected from any current leakage or electric shock, as described at step (406).

Figure 5:
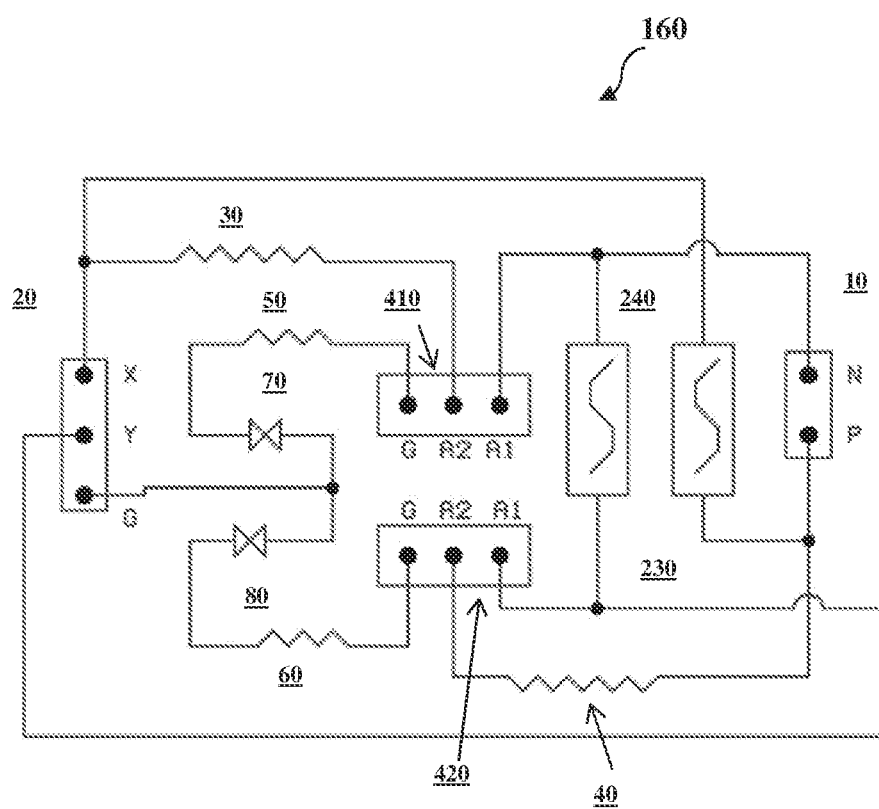
FIG. 5 illustrates an electronic circuit/apparatus comprising two TRIACs, isolating means, and two DIACS for protection against insulation, in accordance with another embodiment of the present disclosure It should be appreciated by those skilled in the art that any block diagrams herein represent conceptual views of illustrative systems embodying the principles of the present subject matter. Similarly, it will be appreciated that any electronic circuit diagrams, flow charts, flow diagrams, and the like represent various processes which may be substantially represented in computer readable medium and so executed by a computer or processor, whether or not such computer or processor is explicitly shown.

FIG. 5 illustrates the apparatus 160 for protection against insulation in accordance with an alternate embodiment of the present disclosure. The apparatus 160 comprises two TRIACs (410, 420), two isolating means i.e., fuses (230, 240), two DIACS (70 and 80), wire wound resistors (30 and 40), carbon resistors (50 and 60), an electrical input at terminal N and P of 10, and an electrical output at terminal X and Y of 20 is connected to the electrical appliance 150, terminal G of 20 is connected to exposed metallic part/body of electrical appliance 150. In comparison to the embodiment of FIG. 3, the circuit of this embodiment is refined by additionally including two DIACS (70, 80) and resistors (30, 40, 50 and 60) to facilitate the triggering of the TRIACS.

In an embodiment, the apparatus 160 comprises a communication module. The communication module can be configured to communicate with a remote device via a remote cloud or server. The communication module can be an Internet of Things (IoT) based communication module selected from the group consisting of a ZigBee module, a Wi-Fi module, a Bluetooth module, a Cellular module, a Z-Wave module, and the like. The apparatus 160 can further include a detection means comprising, for e.g., a switch and a relay. The detection means can be configured to detect leakage in the appliance 150 or insulation failure and generate an alert signal upon detecting insulation failure/leakage. The communication module can be further configured to cooperate with the detection means to receive the alert signal and send an alert message to the remote device to notify a user of the remote device about the detected leakage/insulation failure.

It is also understood that other arrangements of the voltage and current based AC switch failure detection circuits may be employed by those skilled in art to provide detection of the positive and negative halves of the AC switch without departing from the scope and spirit of the present disclosure.

The present disclosure provides an inexpensive and efficient apparatus 160 that is free from control circuits and onboard processors. Further, it does not consume power and is comparatively simpler to other available circuits that perform complex real-time computation. Moreover, the present disclosure reduces harmonic distortions that create inefficiencies in the power supply system. Thus, the present disclosure provides a performance at optimal levels.

The present disclosure provides a solution for detecting insulation failure without requiring any additional sensors as insulation failure itself acts as a trigger signal for the TRIACs (410, 420). Furthermore, the apparatus 160 of the present disclosure does not contain any dynamic/moving parts. The apparatus 160 disclosed in the present disclosure is highly reliable for the detection of the insulation failures as the failure of protective devices does not result in the failure of protection against electric shock. In other words, the electrical appliance 150 will work only when the protective devices are good/working.

The embodiments herein described are provided for the purpose of illustration and not limitation of the present disclosure. The various components described in connection with the present circuits are commercially available, or can be configured in accordance with known principles, all within the abilities of those skilled in the art, dependent upon the specific requirements of a given load circuit, whether it be a main service circuit or branch circuit, or other circuits separately embodied in various forms of equipment.

In the foregoing description of the several embodiments herein no mention has been made of ground circuits and connections which are routinely provided in electrical circuits. The present disclosure operates independently of these ground circuits.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

TECHNICAL ADVANCEMENT

The present disclosure described herein above has several technical advantages including, but not limited to, the realization of an apparatus for protection against insulation failure, that:

protects a user from an electric shock or high-power surges in an electric appliance;

protects the user against electric shock without the need of grounding or earthing the electric wire;

isolates an electric appliance from the power supply in case of current leakage or electrical surges above the threshold limit to protect the appliance;

disconnects the user from the supply-side by blowing off all the fuses connected in series in a protective circuit; and is used to provide protection against insulation failure in both single phase low power (5A) and high power (15A) loads and three phase loads.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An apparatus for providing protection against an insulation failure in an electrical appliance, said electrical appliance capable of being connected to and receiving power from a single phase AC power source, said apparatus comprising:

a first isolating means connected in phase line of said AC power source;

a second isolating means connected in the neutral line of said AC power source; and at least two TRIACs, said TRIAC connected in parallel to said electrical appliance:

wherein one main terminal of the first TRIAC is connected to the phase line of said AC power source and the other main terminal of the first TRIAC is connected to the neutral line after said second isolating means through a wire wound resistance;

wherein one main terminal of the second TRIAC is connected to the phase line after said first isolating means and the other main terminal of the second TRIAC is connected to the neutral line of said AC power source through a wire wound resistance; and wherein a gate terminal of each of the first TRIAC and the second first TRIAC being connected to the body of the appliance through a carbon resistance and a DIAC;

wherein, in the event of insulation failure in said electrical appliance (150), current flows from the body of said appliance into said gate terminal of each of said first TRIAC and said first TRIAC, wherein each of said first TRIAC and said second TRIAC is configured to be triggered when a pre-determined level of current flows into said gate terminal, and wherein, upon being triggered, each of said first TRIAC and second TRIAC conducts and provides a low-resistance path between the phase line and the neutral line, causing said first and second isolating means to blow out and thereby electrically isolate said appliance from said AC power source.

2. The apparatus according to claim 1, wherein said first isolating means and said second isolating means are fuses.

3. The apparatus according to claim 2, wherein each of said isolating means has a current rating in the range of 5A to 15A.

4. The apparatus according to claim 1, which is configured to isolate said electrical appliance from said AC power source in less than 5 milliseconds.

5. The apparatus according to claim 1, which provides protection against an insulation failure in single-phase low and high power electrical appliances.

* * * * *